United States Patent Office 3,842,043
Patented Oct. 15, 1974

3,842,043
PROCESS FOR PREPARING POLYESTERS IN THE PRESENCE OF AN IMPROVED POLYCONDENSATION CATALYST
Kazuya Chimura, Kazuo Ito, Shunichi Takashima, and Masao Kawashima, Otake, Japan, assignors to Mitsubishi Rayon Company, Limited, Tokyo, Japan
Continuation-in-part of abandoned application Ser. No. 10,260, Feb. 10, 1970. This application Mar. 14, 1973, Ser. No. 340,996
Int. Cl. C08g 17/015
U.S. Cl. 260—75 R                6 Claims

ABSTRACT OF THE DISCLOSURE

Polyesters such as polyethylene terephthalate having high whiteness, high transparency and excellent physical properties are prepared by polycondensing a polycondensation mixture containing glycol terephthalate and a polycondensation catalyst solution containing germanium dioxide, glycol and a solubilizing agent selected from calcium, magnesium, strontium and zinc metals and salts and alkoxides of the above-mentioned metals.

RELATED APPLICATIONS

Figure 1:
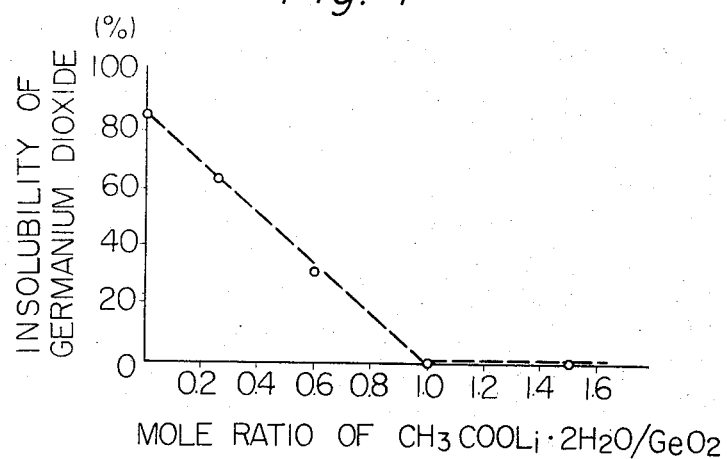
Figure 2:
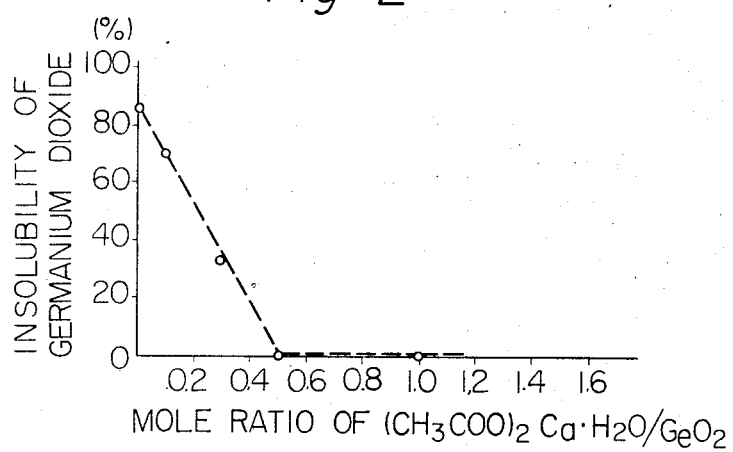

This application is a continuation-in-part of our copending application Ser. No. 10,260, filed Feb. 10, 1970, now abandoned claiming the priority of Japanese application No. 16,147/69; No. 16,305/69; No. 20,628/69 and No. 22,867/69, filed Mar. 4, 5, 18 and 26, 1969, respectively.

FIELD OF THE INVENTION

The present invention relates to a process for preparing polyesters in the presence of an improved polycondensation catalyst, more particularly, relates to a process for preparing polyesters in the presence of an improved polycondensation catalyst solution in which germanium dioxide is dissolved in a glycol solvent in the presence of a specific solubilizing agent.

BACKGROUND OF THE INVENTION

It is broadly well known that polyesters, for example, polyethylene terephthalate and copolymerized polyesters mainly containing an ethylene terephthalate unit, are very valuable for industrially manufacturing fibers, films and moldings. Generally, these polyesters may be prepared through two reaction steps. That is, in the first step, a bis-glycol terephthalate or its oligomer is prepared by esterification of terephthalic acid with a glycol, an ester interchange reaction of a lower-alkyl terephthalate with a glycol, or esterification of terephthalic acid with a 1,2-epoxy alkane, and then, in the second step, the terephthalate or its oligomer is polycondensed at high temperature and reduced pressure.

In order to accelerate the first and second reactions, a catalyst is generally used. The catalyst is not only effective for accelerating the reactions but is related to color, crystallinity, heat resistivity and mechanical properties of the resultant polyesters.

The conventional catalysts for accelerating the second reaction, that is, polycondensation, tend to yellow the resultant polyesters. Therefore, a number of improvements have been proposed to overcome this disadvantage. Usually, antimony compounds are industrially used for this purpose. It is true that the antimony compounds are effective for preparing substantially non-colored polyesters having high crystallinity, high heat resistivity and excellent mechanical properties. However, the antimony compound catalysts have a tendency to reduce to metallic antimony during polycondensation and the metallic antimony causes coloring of the resultant material dark grey or green.

Further, the metallic antimony causes a reduction of the transparency of the resultant polymer owing to its insolubility in the resultant polymer and a polymer of such low transparency is not usable for film.

In order to prepare colorless polyesters having high transparency of high whiteness, U.S. Pat. 2,578,660 disclosed a process for preparing polyester in the presence of metallic germanium or germanium dioxide catalyst. However, generally, crystalline germanium dioxide has a low solubility in the poly-condensation system. Thus, the resultant polymer is non-transparent. The non-transparent polymers thus obtained result in the stopping up of the spinneret and breaking of the filament during the drawing process. In order to overcome the disadvantages of the conventional antimony compound catalysts, U.S. Pat. 3,074,913 disclosed a process for preparing polyester in the presence of a soluble germanium compound catalyst, U.S. Pat. 3,377,320 disclosed a process for preparing polyester by using an amorphous germanium dioxide catalyst.

Practical catalysts usable for industrial preparation of polyesters are required to have the following features, that is, they should be easily obtainable, easily handled and be available at low cost. In consideration of the above-stated features, germanium dioxide is most valuable for industrial use.

Broadly speaking, germanium dioxide exists in two-conditions, i.e. a crystalline type and amorphous type. The crystalline germanium dioxide has a low solubility in the polycondensation system and the amorphous germanium dioxide has a high solubility in the system. That is to say, crystalline germanium dioxide can be dissolved in ethylene glycol in an amount of 0.3% by weight by heating at the boiling point for 2 hours and amorphous germanium dioxide can be dissolved in ethylene glycol in an amount of 5% by weight by the same treatment.

However, since amorphous germanium dioxide in the ethylene glycol solution is separated from the solution by cooling from the boiling point to room temperature, the content of amorphous germanium dioxide in the ethylene glycol solution at room temperature is substantially 0.3% by weight. Therefore, the solubility of the amorphous type is approximately the same as that of the crystalline type at room temperature.

In the practical application of germanium dioxide as a catalyst for industrial poly-condensation, germanium dioxide is used as a solution in ethylene glycol. In such a case, it is very important that the content of the germanium dioxide be as high as possible.

For this purpose, British Pat. 1,091,234 disclosed a process for dissolving germanium dioxide at a high temperature; Netherlands Pat. 6713936 disclosed a process for preparing a catalyst solution in which a portion of ethylene glycol is distilled from the solution, and Netherlands Pat. 6807741 disclosed a process for preparing a catalyst solution wherein germanium dioxide is dissolved in water and then the water is replaced by ethylene glycol. These processes are only effective for obtaining a catalyst solution containing at most about 0.3% by weight of germanium dioxide, but are not effective for preparing a catalyst solution containing a greater content of germanium dioxide.

It is an object of this invention to provide an improved catalyst solution for the polycondensation of polyesters which is more effective than the conventional catalysts.

It is another object of the present invention to provide a process for preparing polyesters having high whiteness, high transparency, a high degree of polymerization, high crystallinity and excellent physical properties.

THE INVENTION

According to the present invention there is provided a process for preparing polyesters comprising polycondensing at least one glycol terephthalate in the presence of a polycondensation catalyst which is prepared by dissolving germanium dioxide in a glycol solvent in the presence of a solubilizing agent selected from the group consisting of, calcium, magnesium, strontium and zinc, and formates, acetates, benzoates, linear polyphosphates, citrates, oxalates, methoxides, ethoxides, propoxides, butoxides and ethylene glycoxides of the above-mentioned metals, in a ratio of 0.25 to 2.0 atoms of the solubilizing agent metal per atom of germanium.

DETAILS OF THE INVENTION

As stated above, crystalline germanium dioxide has a very low solubility in glycols. However, if crystalline germanium dioxide is dissolved in a glycol in the presence of a solubilizing agent such as the metallic elements stated above or the stated salts or alkoxides of these elements, the germanium dioxide is easily dissolved in the glycol at a high concentration, and the solution thus obtained is very stable so that the dioxide is not separated from the solution even if the solution is cooled from the boiling point of the glycol solvent to room temperature.

For example, crystalline germanium dioxide has a solubility of, at most, 0.3% by weight in ethylene glycol at its boiling point, but has a solubility of at least 3% by weight in the presence of an equimolar amount of calcium acetate as that of the dioxide at a temperature not exceeding the boiling point of ethylene glycol. Moreover, even if the solution is allowed to cool from its boiling point to room temperature, solid germanium dioxide does not separate from the solution. Needless to say, the solubilizing agent stated above is effective for dissolving amorphous germanium dioxide, which has a solubility in a glycol solvent higher than that of the crystalline germanium dioxide, in an amount higher than that of the conventional catalyst solution, and the solution thus obtained, for example, a solution containing 5% by weight of amorphous germanium dioxide, is very stable so that the dioxide does not separate from the solution even at room temperature.

The effect of the solubilizing agents will be further described by referring to the accompanying drawing which shows the effect of calcium acetate with respect to the solubility of crystalline germanium dioxide in ethylene glycol.

The drawing shows the relationship between the insolubility of crystalline germanium dioxide and the mole ratio of the quantity of calcium acetate with respect to the quantity of germanium dioxide in a catalyst solution which was prepared by heating 1.0 g. of crystalline germanium dioxide in 100 g. of ethylene glycol in the presence of various quantities of calcium acetate at the boiling point of ethylene glycol for 2 hours in a nitrogen gas atmosphere.

In this case, the insolubility of germanium dioxide means a ratio of the residual weight fraction of germanium dioxide which is not dissolved in solvent with respect to the original weight of germanium dioxide added to the solvent. The drawing clearly shows that the insolubility of germanium dioxide is relative to the quantity of the solubilizing agent, in other words, the effect of the solubilizing agent is relative to the quantitative relationship between germanium dioxide and the solubilizing agent.

That is, in order to completely dissolve 1.0 g. of crystalline germanium dioxide into 100 g. of ethylene glycol, under the above-stated condition, ½ mole of calcium acetate is required for 1 mol of the crystalline germanium dioxide.

However, it is obvious that the interaction never causes production of calcium metagermanate because this has a very low solubility of at most 0.3% by weight in ethylene glycol.

The process of the present invention for preparing polyesters has the following advantages.

(1) A transparent polyester is obtained; although the conventional catalyst containing germanium dioxide, particularly crystalline germanium dioxide which has a low solubility in polycondensation system, causes production of a non-transparent polymer and frequent breaking of filaments spun from the polymer at the drawing step;

(2) A stable catalyst solution containing a high content of germanium dioxide can be utilized for preparing colorless polyesters, although the conventional catalyst solution prepared at a temperature not lower than the boiling point of the glycol and containing approximately 0.5% by weight of germanium dioxide causes coloration of the catalyst solution, with coloration of the resultant polymer, and creation of ether-type bonding in the resultant polymer;

(3) Loss of the germanium catalyst during polycondensation is very small therefore, 80 to 90% by weight of the catalyst used remains in the resultant polymer, although, in the conventional polymerization, 50 to 60% by weight of germanium dioxide escapes from the polycondensation system during polycondensing, and thus only 40 to 50% of the catalyst used remains in the resultant polymer. This feature is valuable for industrially controlling the polycondensation;

(4) The linear polyphosphoric acids are effective for preparing polyester having a relatively lower content of the ether-type bonding than the conventional case. The polyester thus obtained has excellent heat-resistivity.

The solubilizing agent effective for the process of the present invention is selected from the group consisting of the metallic elements calcium, magnesium, strontium and zinc, and their formates, acetates, benzoates, linear polyphosphates, citrates, oxalates, methoxides, ethoxides, propoxides, butoxides and ethylene glycoxides of the above-mentioned metals.

In the polycondensation process of the present invention, the glycol solvent in which germanium dioxide is dissolved includes ethylene glycol, trimethylene glycol, tetramethylene glycol, or 1,4-cyclohexane dimethanol.

The catalyst solution may be prepared by heating a mixture of a predetermined quantity of germanium dioxide and a predetermined quantity of a glycol solvent, in the presence of at least one solubilizing agent as indicated hereinbefore, to a desired temperature, if necessary, in a nitrogen gas atmosphere with stirring.

It is preferable that the amount of catalyst added is such that the content of germanium dioxide is 0.005 to 0.05% based on a total weight of the acid component.

Further, it is desirable that the content of germanium dioxide in the catalyst solution be as high as possible, preferably in a range from 0.3 to 10.0% by weight. If the content of germanium dioxide is lower than 0.3% by weight, the accelerating effect of the solubilizing agent on the dissolution of germanium dioxide is not clear and if the content is higher than 10% by weight, it is difficult, in practice, to obtain a stable catalyst solution.

The solubilizing agent is present in the catalyst solution in a ratio of 0.25 to 2.0 atoms of the solubilizing agent metal to 1 atom of germanium. If the content of the solubilizing agent is lower than the lower limit stated above, the content of germanium dioxide in the catalyst solution is insufficient, and if the content is higher than the upper limit stated above, coloring of the resultant polymer may be caused owing to some undesirable side reaction.

The process of the present invention is capable of application for preparing not only polyalkylene terephthalates, but also copolymers mainly containing alkylene terephthalate units. In such case, it is desirable that the glycol terephthalic is mixed with at least one polycondensation component selected from the group consisting of isophthalates, phthalates, adipates, succinates, 4-β-hydroxyethoxy benzoates of ethylene glycol, diethylene glycol, 1,4-butane diol and 1,4-cyclohexane dimethanol.

Stabilizing agents, coloring materals, such as pigments and dyestuffs, and delustering agents for polyesters may be added to the polycondensation system to be subjected to the process of the present invention.

Further features and effects of the present invention will be described in the examples stated hereinafter. These examples are intended merely to illustrate the present invention and not in any sense to limit the manner in which the present invention is practiced. In the examples, intrinsic viscosity [η] of the resultant polymer was determined in a mixed solvent of tetrachloroethane and phenol (1:1) at a temperature of 25° C. Content of diethylene glycol (DEG) in the resultant polymer was determined by gas chromatography of hydrolyzed polymer, content of terminal carboxylic group [—COOH] in the resultant polymer was determined by titrating a solution of the resultant polymer in benzyl alcohol with a solution of potassium hydroxide in benzyl alcohol, and content of residual germanium dioxide in the resultant polymer was determined by a manner in which the resultant polymer was burnt in a closed crucible, the residual ash was extracted with water and then the resultant solution was subjected to colorimetric determination using phenyl fluorone (2,6,7-trioxy-9-phenyl-6-fluorone).

EXAMPLES 1 TO 20

Preparation of polycondensation catalyst solutions

A-1 to A-4, B-1 to B-8, C-1 to C-2 and D-1 to D-6

Twenty separate catalyst solutions were prepared from a mixture of germanium dioxide and solubilizing agents, contents of which aer illustrated in Table 1, and 100 g. of ethylene glycol.

The mixture was raised from room temperature to its boiling point within about 40 minutes with stirring and kept at the boiling point for 90 minutes in order to dissolve germanium dioxide, except for the catalyst solutions of magnesium, zinc and their compounds, which are heated at 140° C.

The obtained solutions were allowed to cool to 100° C. and separately filtered through a glass filter, the residue was washed with acetone, dried and then weighed. The insoluibility of germanium dioxide for every solution was calculated from the original content of germanium dioxide and its weighed value of the residue.

Six comparative catalyst solutions (a) to (f) were prepared from germanium compounds as shown in Table 1 and 100 g. of ethylene glycol without any solubilizing agent of the present invention, respectivley. In comparative examples, 1 to 6, the preparation of the catalyst solutions (a) to (c) were carried out in the same manner as stated above. But the preparation of the catalyst solution (d) was carried out by a high pressure high temperature process stated in British Pat. No. 1,091,234, wherein 1 g. of crystalline germanium dioxide and 100 g. of ethylene glycol were mixed and heated at 280° C. for 90 minutes in an autoclave in a nitrogen gas atmosphere. The preparation of the catalyst solution (e) was carried out in the following manner: a mixture of 1 g. of crystalline germanium dioxide and 150 g. of ethylene glycol was heated at its boiling point followed by evaporation of 50 g. of ethylene glycol. The preparation of the catalyst solution (f) was carried out in the following manner: 1 g. of crystalline germanium dioxide was dissolved in 200 g. of water at its boiling point, 110 g. of ethylene glycol were added to the water solution followed by homogenization of the solution, and then the solution was evaporated so as to remove 210 g. of a mixture of water and ethylene glycol from the solution.

In the preparation of the catalyst solution (j), 1 g. of calcium metagermanate was dissolved in 100 g. of ethylene glycol by heating at its boiling point for 90 minutes (Comparative Example 7). As is clear in Table 1, metals such as calcium, magnesium, strontium and zinc and their stated salts and alkoxides are effective for increasing both the solubility of germanium dioxide with respect to ethylene glycol and the stability of the catalyst solutions at room temperature.

Further, Table 1 shows that calcium metagermanate has a low solubility to ethylene glycol. Furthermore, Table 1 shows that calcium and strontium and their compounds each have a solubilizing effect higher than that of zinc, magnesium and their stated compounds.

TABLE 1

| | Symbol of catalyst solution | Solubilizing agent (grams) | | Catalyst GeO₂ (grams) | | Insolubility | | Separation of solid from solution at room temperature |
|---|---|---|---|---|---|---|---|---|
| | | | | | | (Grams) | (Percent) | |
| Example: | | | | | | | | |
| 1 | A-1 | Calcium | 0.23 | Crystalline | 1.00 | 0.007 | 0.7 | None. |
| 2 | A-2 | Magnesium | 0.12 | do | 1.00 | 0.015 | 1.5 | Slightly. |
| 3 | A-3 | Strontium | 0.90 | do | 2.08 | 0.010 | 0.5 | None. |
| 4 | A-4 | Zinc | 0.70 | do | 2.08 | 0.030 | 1.5 | Slightly. |
| 5 | B-1 | Magnesium formate | 1.15 | do | 2.08 | 0.015 | 0.7 | None. |
| 6 | B-2 | Calcium acetate | 1.00 | do | 1.00 | 0.005 | 0.5 | Do. |
| 7 | B-3 | do | 3.00 | do | 3.00 | 0.015 | 0.5 | Do. |
| 8 | B-4 | do | 1.00 | Amorphous | 1.00 | 0.002 | 0.2 | Do. |
| 9 | B-5 | do | 4.25 | do | 5.00 | 0.011 | 0.2 | Do. |
| 10 | B-6 | Magnesium acetate | 1.50 | Crystalline | 1.00 | 0.012 | 1.2 | Do. |
| 11 | B-7 | Strontium acetate | 1.50 | do | 1.00 | 0.009 | 0.9 | Do. |
| 12 | B-8 | Zinc acetate | 1.50 | do | 1.00 | 0.018 | 1.8 | Slightly. |
| 13 | C-1 | Calcium benzoate | 2.82 | do | 2.08 | 0.010 | 0.5 | None. |
| 14 | C-2 | Calcium pyrophosphate | 1.25 | do | 1.00 | 0.028 | 2.8 | Do. |
| 15 | D-1 | Calcium methoxide | 1.00 | do | 2.08 | 0.015 | 0.7 | Do. |
| 16 | D-2 | Calcium ethoxide | 0.90 | do | 1.00 | 0.005 | 0.5 | Do. |
| 17 | D-3 | Strontium propoxide | 1.50 | do | 1.00 | 0.008 | 0.8 | Do. |
| 18 | D-4 | Magnesium butoxide | 1.70 | do | 2.08 | 0.015 | 0.7 | Slightly. |
| 19 | D-5 | Calcium ethylenegylcoxide | 1.65 | do | 2.08 | 0.012 | 0.6 | None. |
| 20 | D-6 | Zinc ethyleneglycoxide | 1.30 | do | 1.00 | 0.016 | 1.6 | Slightly. |
| Comparative example: | | | | | | | | |
| 1 | a | None | | do | 1.00 | 0.86 | 86.0 | None. |
| 2 | b | do | | Amorphous | 1.00 | 0.006 | 0.6 | Separated. |
| 3 | c | do | | do | 5.00 | 0.015 | 0.3 | Do. |
| 4 | d | {None (high pressure) / None (high temperature)} | | Crystalline | 1.00 | 0.675 | 67.5 | None (apparently colored). |
| 5 | e | None | | do | 1.00 | 0.875 | 87.5 | Separated. |
| 6 | f | do | | do | 1.00 | 0.001 | 0.1 | Do. |
| 7 | j | Calcium metagermanate | | | 1.00 | 0.83 | 83 | None. |

EXAMPLES 21 TO 40

Polycondensation of dimethyl terephthalate and ethylene glycol

These examples relate to preparations of polyethylene terephthalate by using the catalyst solutions illustrated in Table 1. Twenty procedures were repeated under the following condition. A mixture containing 1,000 g. of dimethyl terephthalate, 750 g. of ethylene glycol and 0.5 g. of calcium acetate was slowly heated with stirring in a nitrogen gas atmosphere so as to raise its temperature to 220° C. within about 3 hours, in order to complete the ester interchange reaction. Methyl alcohol produced from the ester interchange system was distilled off from the system. After the ester interchange reaction was completed, the system was heated at 240° C. for 40 minutes in order to eliminate residual ethylene glycol from the system. After this elimination was completed, 0.5 g. of triphenyl phosphite and a member selected from the catalyst solutions shown in Table 2 were mixed into the system to provide homogeneous condition and in an amount that a ratio of germanium dioxide with respect to dimethyl terephthalate was 0.03% by weight. The mixture was charged into a polycondensation reactor and heated from 240° C. to 285° C. within 1 hour while the pressure in the reactor was reduced from 760 mm. Hg to 1 mm. Hg, and remained under the condition of 1 mm. Hg pressure and 285° C. temperature for two hours with stirring in order to complete the polycondensation.

Six comparative tests were carried out by using a member selected from the catalyst solutions (a) to (f) illustrated in Table 1.

Results of the present Examples 21 to 40 and the comparative Examples 8 to 13 are indicated in Table 2.

Table 2 clearly shows that the polymers obtained from the method of the present invention had high degrees of polymerization and that the escape of germanium dioxide in the polymerization system was prevented. The resultant polymers were colorless and transparent.

TABLE 2

| | Catalyst solution | | Features of resultant polymer | | | |
|---|---|---|---|---|---|---|
| | Symbol | Addition (g.) | $[\eta]$ | Content of DEG (wt. percent) | Content of terminal [—COOH] eq./$10^6$ g. | (1) |
| Example: | | | | | | |
| 21 | A-1 | 30.3 | 0.732 | 0.95 | 29 | 85 |
| 22 | A-2 | 30.5 | 0.726 | 0.96 | 30 | 83 |
| 23 | A-3 | 14.4 | 0.730 | 0.83 | 30 | 84 |
| 24 | A-4 | 14.6 | 0.695 | 0.81 | 29 | 76 |
| 25 | B-1 | 14.4 | 0.715 | 0.82 | 30 | 80 |
| 26 | B-2 | 30.3 | 0.735 | 0.91 | 31 | 88 |
| 27 | B-3 | 10.0 | 0.737 | 0.89 | 27 | 80 |
| 28 | B-4 | 30.3 | 0.739 | 0.91 | 29 | 82 |
| 29 | B-5 | 6.0 | 0.730 | 0.92 | 23 | 80 |
| 30 | B-6 | 30.5 | 0.722 | 0.91 | 28 | 84 |
| 31 | B-7 | 30.4 | 0.724 | 0.94 | 26 | 81 |
| 32 | B-8 | 30.4 | 0.729 | 1.04 | 33 | 82 |
| 33 | C-1 | 14.4 | 0.723 | 0.81 | 28 | 80 |
| 34 | C-2 | 31.0 | 0.712 | 0.93 | 27 | 84 |
| 35 | D-1 | 14.4 | 0.727 | 0.85 | 31 | 83 |
| 36 | D-2 | 30.3 | 0.720 | 0.92 | 29 | 80 |
| 37 | D-3 | 30.4 | 0.723 | 0.93 | 27 | 82 |
| 38 | D-4 | 14.4 | 0.735 | 0.85 | 33 | 83 |
| 39 | D-5 | 14.4 | 0.731 | 0.84 | 34 | 82 |
| 40 | D-6 | 30.5 | 0.724 | 0.98 | 31 | 79 |
| Comparative example: | | | | | | |
| 8 | a | 215.0 | 0.723 | 0.98 | 30 | 31 |
| 9 | b | 30.3 | 0.728 | 1.01 | 30 | 30 |
| 10 | c | 6.0 | 0.729 | 1.0 | 30 | 29 |
| 11 | d | 92.4 | 0.720 | 1.06 | 33 | 30 |
| 12 | e | 240.0 | 0.723 | 1.0 | 31 | 29 |
| 13 | f | 30.3 | 0.724 | 0.99 | 30 | 33 |

1 Ratio of GeO₂ content in resultant polymer with respect to its original content in polymerization system (wt. percent)

EXAMPLES 41 TO 47

(1) Preparation of polyester

A mixture containing 50 kg. of dimethyl terephthalate, 37.5 kg. of ethylene glycol and 25 g. of calcium acetate as the ester interchange catalyst was slowly heated to a temperature range of from 150 to 220° C. within about 3 hours, in order to complete the ester interchange reaction. The ester interchange system was further heated at 240° C. for 40 minutes for eliminating residual ethylene glycol under normal pressure from this system. After the elimination was completed, the system was mixed, with the addition of 25 g. of trimethylphosphate and a solution of hexagonal germanium dioxide dissolved in 1 kg. of ethylene glycol in the presence of a member selected from alkaline metals or alkaline earth metals shown in Table 3. A homogeneous mixture thus obtained was then charged into a polycondensation reactor and heated at a temperature from 240° C. to 285° C. for 1 hour while reducing of pressure in the reactor from 760 mm. Hg to 1 mm. Hg, and retained under the condition of 1 mm. Hg pressure and of 285° C. temperature for 2 hours with stirring in order to complete the polycondensation.

(2) Comparison preparation of polyester—by the conventional process (U.S. Pat. 3,651,017 of Tanabe et al.)

A system containing 100 parts of dimethyl terephthalate, 100 parts of ethylene glycol and 0.05 parts of zinc acetate as the ester interchange catalyst was heated at 185° C. for 2 hours, in order to complete the ester interchange reaction, and the methanol formed was distilled off the system.

Then a predetermined amount of hexagonal germanium dioxide dissolved in 10 parts of ethylene glycol in the presence of a compound of the alkaline metal or alkaline earth metal shown in Table 3, and a predetermined amount of trimethyl phosphate dissolved in 10 parts of ethylene glycol were added to the system. Thereafter the temperature of the system was raised to 275° C. within about 30 minutes so that the ethylene glycol was distilled off. Subsequently the polycondensation was performed for 15 minutes at 30 mm. Hg, and further at a reduced pressure of 1 mm. Hg to obtain a polymer.

(3) Preparation of fiber specimens

The polymer, prepared in (1) and (2) above, was spun under the spinning speed of 1,200 m./min. at a temperature of 285° C. The spun polymer was further drawn to 3.4 times its original length by a pin-plate type drawing machine with 90° C. of pin temperature and 140° C. of plate temperature. A thread of 73 d./36 f. was obtained from this procedure.

(4) Experimental results

Examples 41 to 43, and Comparative Examples 14 and 15 of Table 3 were prepared under the conditions and in the proportions set forth in the present application whereas Examples 44 to 47 and Comparative Examples 16 to 20 were prepared according to the conditions and proportions set forth in the Tanabe et al. patent. This permits absolute comparison of the effect of the alkaline metal ions vs. alkaline earth metal ions.

In Table 3, Y value and PI value (=100—Pe "excitation purity") were determined, in accordance with the International color indicating standard established by Commission International de l'Eclairge in 1931, as follows: The filament test specimen was illuminated by a whitebeam in an automatic recording spectrophotometer (manufactured by Hitachi Seisakusho, Japan; Model EPR-2). Reflectance was measured on the test specimen and the magnesium oxide standard white surface, the latter being used as the standard.

The smaller the Y value (luminous reflectance), the deeper the coloring of the filament, and, the greater the PI value, the nearer the reflection light approaches pure white.

As is apparent from Table 3, the process of the cited invention where alkaline metal or its compound is used as the solubilizing agent, produces filaments with Y values which are much smaller and PI values which are smaller than the present invention when a compound of alkaline earth metal is used.

This means that the filament produced by the cited U.S. patent is tinged with yellow and/or gray. By contrast, the filament obtained through the process of the presently claimed invention possesses an excellent whiteness, a property which is extremely important in the acrylic fiber industry where great efforts have been expended to obtain a filament with a color as white as possible.

Such being the case, it is clear that the process according to this invention results in better effects than that of the reference.

The catalyst solution thus obtained was valuable for accelerating the polycondensation.

What we claim is:

1. A process for preparing polyesters comprising polycondensing at least one glycol terephthalate in the pres-

TABLE 3

| | Additive | | Hexagonal GeO$_2$ | Atomic ratio (metal/Ge) | TMPO [1] | Polymerization time [2] | | [η] | Filament | |
|---|---|---|---|---|---|---|---|---|---|---|
| | Compound | Amount | | | | Hour | Minutes | | Y value (percent) | PI value (percent) |
| Example: | | | | | | | | | | |
| 41 | Calcium acetate | 12.6 g | 15 g | 0.5 | | 1 | 35 | 0.725 | 90 | 99.1 |
| 42 | Magnesium acetate | 15.4 g | 15 g | 0.5 | | 1 | 30 | 0.721 | 90 | 99.1 |
| 43 | Strontium acetate | 15.4 g | 15 g | 0.5 | | 1 | 35 | 0.719 | 90 | 99.0 |
| 44 | Calcium acetate | 0.026 (parts) | 0.03 (parts) | 0.5 | 0.03 (parts) | 1 | 30 | 0.724 | 90 | 99.1 |
| 45 | Magnesium acetate | 0.031 (parts) | 0.03 (parts) | 0.5 | 0.04 (parts) | 1 | 35 | 0.720 | 90 | 99.0 |
| 46 | Strontium acetate | 0.021 (parts) | 0.02 (parts) | 0.5 | 0.03 (parts) | 1 | 38 | 0.721 | 90 | 99.1 |
| 47 | Calcium | 0.006 (parts) | 0.03 (parts) | 0.5 | 0.03 (parts) | 1 | 32 | 0.726 | 89 | 98.9 |
| Comparative example: | | | | | | | | | | |
| 14 | Potassium acetate | 14.6 g | 15 g | 1.0 | | 1 | 45 | 0.723 | 88 | 98.7 |
| 15 | Sodium acetate | 11.8 g | 15 g | 1.0 | | 1 | 40 | 0.712 | 87 | 98.8 |
| 16 | Potassium hydroxide | 0.016 (parts) | 0.03 (parts) | 1.0 | 0.03 (parts) | 1 | 37 | 0.718 | 87 | 98.8 |
| 17 | Sodium hydroxide | 0.005 (parts) | 0.01 (parts) | 1.3 | 0.043 (parts) | 1 | 56 | 0.720 | 87 | 98.8 |
| 18 | Sodium | 0.0066 (parts) | 0.03 (parts) | 1.0 | 0.03 (parts) | 1 | 35 | 0.716 | 87 | 98.7 |
| 19 | Potassium carbonate | 0.02 (parts) | 0.03 (parts) | 1.0 | 0.05 (parts) | 1 | 41 | 0.721 | 88 | 98.8 |
| 20 | Sodium carbonate | 0.01 (parts) | 0.02 (parts) | 1.0 | 0.02 (parts) | 1 | 44 | 0.722 | 87 | 98.8 |

[1] Trimethyl phosphate.
[2] Polymerization time after reached to 1 mm. Hg pressure.

EXAMPLE 48

8.5 g. of calcium acetate, 10 g. of crystalline germanium dioxide and 1,000 g. of ethylene glycol were mixed. The mixture was heated to its boiling point in a nitrogen gas atmosphere in order to prepare a catalyst solution.

9,000 g. of dimethyl terephthalate, 1,000 g. of dimethyl isophthalate and 7,500 g. of ethylene glycol were mixed and heated. When the temperature of the reaction system was raised to 150° C., 3 g. of manganese acetate were added to the mixture in order to accelerate the ester interchange reaction of the system and methyl alcohol produced owing to the ester interchange reaction was distilled off. After 2 hours and 40 minutes, the temperature of the system was raised to 220° C. in order to complete the ester interchange reaction. Next, the system was further heated to a temperature of 245° C. in order to distill off excess ethylene glycol from the system and the 5 g. of triphenyl phosphite and 300 g. of the above-prepared catalyst solution were added into the system. The system was homogenized and charged into a polycondensation reactor followed by heating from 245° C. and 285° C. for 45 minutes while reducing the pressure in the reactor from 760 mm. Hg to 1 mm. Hg. The system was maintained at a temperature of 285° C. and pressure of 1 mm. Hg for 3 hours in order to complete the polycondensation.

The resultant polymer had 0.793 of [η], 0.92% by weight of DEG, 31 eq./10$^6$ g. of terminal carboxylic group and 85% ratio of germanium dioxide with respect to its original content in the polymerization system, and was colorless and transparent.

EXAMPLE 49

1 g. of crystalline germanium dioxide was dissolved in 100 g. of trimethylene glycol in the presence of 0.23 g. of calcium by heating at its boiling point for 90 minutes with stirring.

After filtration, 0.03 g. of solid residue remained on the filter. This showed that 97% of the original weight of germanium dioxide used was dissolved in trimethylene glycol.

ence of a polycondensation catalyst which is prepared by dissolving germanium dioxide in a glycol solvent in the presence of a solubilizing agent selected from the group consisting of calcium, magnesium, strontium and zinc, and formates, acetates, benzoates, linear polyphosphates, citrates, oxalates, methoxides, ethoxides, propoxides, butoxides and ethylene glycoxides of the above-mentioned metals, in a ratio of 0.25 to 2.0 atoms of the solubilizing agent metal per atom of germanium.

2. A process as claimed in claim 1, wherein said glycol solvent is selected from ethylene glycol, trimethylene glycol, tetramethylene glycol and 1,4-cyclohexane dimethanol.

3. A process as claimed in claim 1, wherein the content of said germanium dioxide in said polycondensation catalyst is 0.3 to 10% by weight.

4. A process as claimed in claim 1, wherein said glycol terephthalate is selected from terephthalates of ethylene glycol, diethylene glycol, 1,4-butane diol and 1,4-cyclohexane dimethanol.

5. A process as claimed in claim 1, wherein said glycol terephthalate is mixed with at least one copolycondensation component selected from the group consisting of phthalates, isophthalates, adipates, succinates and 4-β-hydroxyethoxy benzoates of ethylene glycol, diethyl glycol, 1,4-butane diol and 1,4-cyclohexane dimethanol.

6. A process as claimed in claim 1, wherein the amount of said germanium dioxide which is present during such polycondensation is 0.005 to 0.05% based on the total weight of the acid component of the glycol terephthalate.

No reference cited.

MELVIN GOLDSTEIN, Primary Examiner

U.S. Cl. X.R.

252—428